(12) United States Patent
Gentry et al.

(10) Patent No.: US 9,797,136 B2
(45) Date of Patent: Oct. 24, 2017

(54) HIGH PERFORMANCE ARCHITECTURAL PRECAST CONCRETE WALL SYSTEM

(71) Applicants: Thomas A. Gentry, Charlotte, NC (US); Brett Q. Tempest, Charlotte, NC (US)

(72) Inventors: Thomas A. Gentry, Charlotte, NC (US); Brett Q. Tempest, Charlotte, NC (US)

(73) Assignee: University of North Carolina at Charlotte, Charlotte, NC (US)

(*) Notice: Subject to any disclaimer, the term of this patent is extended or adjusted under 35 U.S.C. 154(b) by 24 days.

(21) Appl. No.: 14/580,330

(22) Filed: Dec. 23, 2014

(65) Prior Publication Data

US 2016/0010332 A1 Jan. 14, 2016

Related U.S. Application Data

(60) Provisional application No. 61/897,861, filed on Oct. 31, 2013.

(51) Int. Cl.
| | | |
|---|---|---|
| *E04C 2/52* | (2006.01) | |
| *E04C 2/04* | (2006.01) | |
| *E04C 2/288* | (2006.01) | |
| *E04B 2/00* | (2006.01) | |
| *F24D 3/14* | (2006.01) | |
| *E04B 1/74* | (2006.01) | |

(52) U.S. Cl.
CPC .............. *E04C 2/525* (2013.01); *E04C 2/044* (2013.01); *E04C 2/2885* (2013.01); *E04C 2/46* (2013.01); *F24D 3/14* (2013.01); *E04B 1/74* (2013.01)

(58) Field of Classification Search
CPC .......... E04C 2/525; E04C 2/2885; E04C 2/46; E04C 2/044; F24D 3/14; E04B 1/74
USPC ................. 52/220.1, 220.2, 220.3, 220.8
See application file for complete search history.

(56) References Cited

U.S. PATENT DOCUMENTS

| | | | |
|---|---|---|---|
| 2,097,892 A | 11/1935 | Powell | |
| 3,905,203 A | 9/1975 | Jacob | |
| 6,226,942 B1 | 5/2001 | Bonin | |
| 6,401,417 B1 | 6/2002 | Leblang | |
| 6,457,288 B2 | 10/2002 | Zambelli | |
| 6,494,004 B1 | 12/2002 | Zimmerman | |
| 6,718,722 B2 | 4/2004 | Worrell | |
| 6,729,090 B2 * | 5/2004 | Messenger | E04C 2/044 52/309.12 |

(Continued)

FOREIGN PATENT DOCUMENTS

| | | | | |
|---|---|---|---|---|
| AU | 2006202832 | * | 1/2007 | ............. E04C 1/392 |
| FR | 2120242 A7 | * | 8/1972 | ............. E04B 2/8647 |
| FR | EP 2666921 A1 | * | 11/2013 | ............. E04C 1/392 |

*Primary Examiner* — Brian Glessner
*Assistant Examiner* — Adam Barlow
(74) *Attorney, Agent, or Firm* — Blake E. Vande Garde; Erickson Kernell IP, LLC

(57) ABSTRACT

A construction panel comprising a rigid insulation layer having an interior surface and an exterior surface, an outer concrete wythe secured to the exterior surface of the insulation layer, an inner concrete wythe secured to the interior surface of the insulation layer, a grid system which ties the outer concrete wythe to the inner concrete wythe and a capillary tube system located within the construction panel wherein liquid is passed through the tubing in order to increase or decrease the temperature of the construction panel.

11 Claims, 12 Drawing Sheets

(56) References Cited

U.S. PATENT DOCUMENTS

| | | |
|---|---|---|
| 6,779,314 B1 | 8/2004 | Fan |
| 6,941,720 B2 | 9/2005 | DeFord |
| 7,040,066 B2 | 5/2006 | Fan |
| 7,627,997 B2 | 12/2009 | Messenger |
| 7,647,738 B2 | 1/2010 | Nasvik |
| 7,765,759 B2 | 8/2010 | Au |
| 7,765,765 B1 | 8/2010 | Perronne |
| 8,191,324 B2 | 6/2012 | Wallin |
| 8,359,808 B2 | 1/2013 | Stephens |
| 8,484,907 B2 | 7/2013 | Black |
| 8,555,584 B2 | 10/2013 | Ciuperca |
| 8,671,637 B2 | 3/2014 | LeBlang |
| 8,677,706 B2 | 3/2014 | Krecke |
| 8,683,765 B2 | 4/2014 | Hillers |
| 8,745,943 B2 | 6/2014 | Ciuperca |
| 8,789,328 B2 | 7/2014 | Selph |
| 8,844,227 B1 | 9/2014 | Ciuperca |
| 8,877,329 B2 | 11/2014 | Ciuperca |
| 2002/0014051 A1 | 2/2002 | Fraval |
| 2003/0029107 A1 | 2/2003 | Ritter |
| 2003/0079438 A1 | 5/2003 | Stephens |
| 2004/0065034 A1 | 4/2004 | Messenger |
| 2005/0081484 A1 | 4/2005 | Yland |
| 2005/0204698 A1 | 9/2005 | Werner |
| 2005/0262786 A1 | 12/2005 | Messenger |
| 2008/0041004 A1 | 2/2008 | Gibbar |
| 2012/0159877 A1 | 6/2012 | Reid |
| 2014/0150362 A1 | 6/2014 | Propst |
| 2014/0182224 A1 | 7/2014 | Selph |

\* cited by examiner

HIGH PERFORMANCE ARCHITECTURAL PRECAST CONCRETE WALL SYSTEM

RELATED CASES

This application claims the priority of the provisional application Ser. No. 61/897,861 filed Oct. 31, 2013. Applicant hereby incorporates by reference the entire content of provisional application Ser. No. 61/897,861.

APPENDIX

This application contains two appendixes labeled APPENDIX A and APPENDIX B. The entire contents of which are hereby incorporated by reference.

FIELD OF THE INVENTION

The present invention relates to high performance building systems for providing thermal comfort. The invention specifically relates to novel building structural systems capable of regulating interior temperatures. Performance is based on reductions in life cycle greenhouse gas emissions.

BACKGROUND OF THE INVENTION

Environmental sustainability is an ideal which is gaining momentum within the construction industry. Engineers are making great strides towards increased environmental sustainability by updating processes, improving designs and selecting greener materials. These changes are a response to the desires of building owners and operators, as well as those who work and dwell within those buildings. Contractors are realizing that higher performing buildings and infrastructure are required in order to remain competitive. Producers of pre-cast concrete construction materials have raised the performance of their product since the 1940s by finding and exploiting niche benefits that are unique to pre-cast concrete construction. These advances have included developing durable finishes, superior insulative properties in multi-wythe wall components, economy with formwork, rapid constructability and many others. However, the industry must address the greenhouse gas emissions associated with Portland cement, and further integrate the benefits of concrete materials into building functions and operation.

Maintaining acceptable temperatures in buildings (by heating and cooling) accounts for a large proportion of global energy consumption. Thermal insulation in buildings is an important factor to achieving thermal comfort for its occupants. Insulation reduces unwanted heat loss or gain and can decrease the energy demands of heating and cooling systems. Building insulations also commonly use the principle of small trapped air-cells (e.g. fiberglass, cellulose, rock wool, polystyrene foam, urethane foam, vermiculite, perlite, cork, etc.). A well-insulated building is energy-efficient, thus saving the owner money and provides more uniform temperatures throughout the interior space. There is less temperature gradient both vertically (between ankle height and head height) and horizontally from exterior walls, ceilings and windows to the interior walls, thus producing a more comfortable occupant environment when outside temperatures are extremely cold or hot. A well-insulated budding also has minimal recurring expense. Unlike heating and cooling equipment, insulation is designed to be permanent and thus does not require maintenance, upkeep, or adjustment. Insulation helps to lower the carbon footprint required to construct, heat and cool the house.

Another factor which affects a structure's carbon footprint is its thermal mass. In building design, thermal mass is a property of the mass of a building which enables it to store heat, providing "inertia" against temperature fluctuations. For example, when outside temperatures are fluctuating throughout the day, a large thermal mass within the insulated portion of a house can serve to "flatten out" the daily temperature fluctuations, since the thermal mass will absorb thermal energy when the surroundings are higher in temperature than the mass, and give thermal energy back when the surroundings are cooler, without reaching thermal equilibrium. This is distinct from a material's insulation value, which reduces a building's thermal conductivity, allowing it to be heated or cooled relatively separate from the outside, or even just retain the occupants' thermal energy longer. Thermal mass is a term well known in the art and helps to describe an adobe building's ability to avoid temperature fluctuations throughout the day and night even when the outside temperature rises and falls.

In the early part of the twentieth century, most homes in the United States were constructed with little to no thought of energy efficiency or insulation. This was especially true in the northern regions, but less so in the desert southwest. One popular building material in the deserts is adobe due to its thermal mass. An adobe brick is a composite material made of clay mixed with water and an organic material such as straw or dung. The soil composition typically contains clay and sand. Straw is useful in binding the brick together and allowing the brick to dry evenly, thereby preventing cracking due to uneven shrinkage rates through the brick. Adobe can serve as a significant heat reservoir due to the thermal properties inherent in the massive walls typical in adobe construction. In climates typified by hot days and cool nights, the high thermal mass of adobe averages out the high and low temperatures of the day, moderating the living space temperature. The massive walls require a large and relatively long input of heat from the sun and from the surrounding aft before they warm through to the interior. After the sun sets and the temperature drops, the warm wall will then continue to transfer heat to the interior for several hours due to the time lag effect. Thus, a well-planned adobe wall of the appropriate thickness is very effective at controlling inside temperature through the wide daily fluctuations typical of desert climates, a factor which has contributed to its longevity as a building material.

A need exists to devise a building structure system which decreases the carbon footprint of both the building materials used to create the structure and the carbon footprint to maintain the comfort of the individuals within that structure.

SUMMARY OF THE INVENTION

A construction panel comprising a rigid insulation layer having an interior surface and an exterior surface, an outer concrete wythe secured to the exterior surface of the insulation layer, an inner concrete wythe secured to the interior surface of the insulation layer, a grid system which ties the outer concrete wythe to the inner concrete wythe and a capillary tube system located within the construction panel wherein liquid is passed through the tubing in order to increase or decrease the temperature of the construction panel.

DETAILED DESCRIPTION

Figure 1:
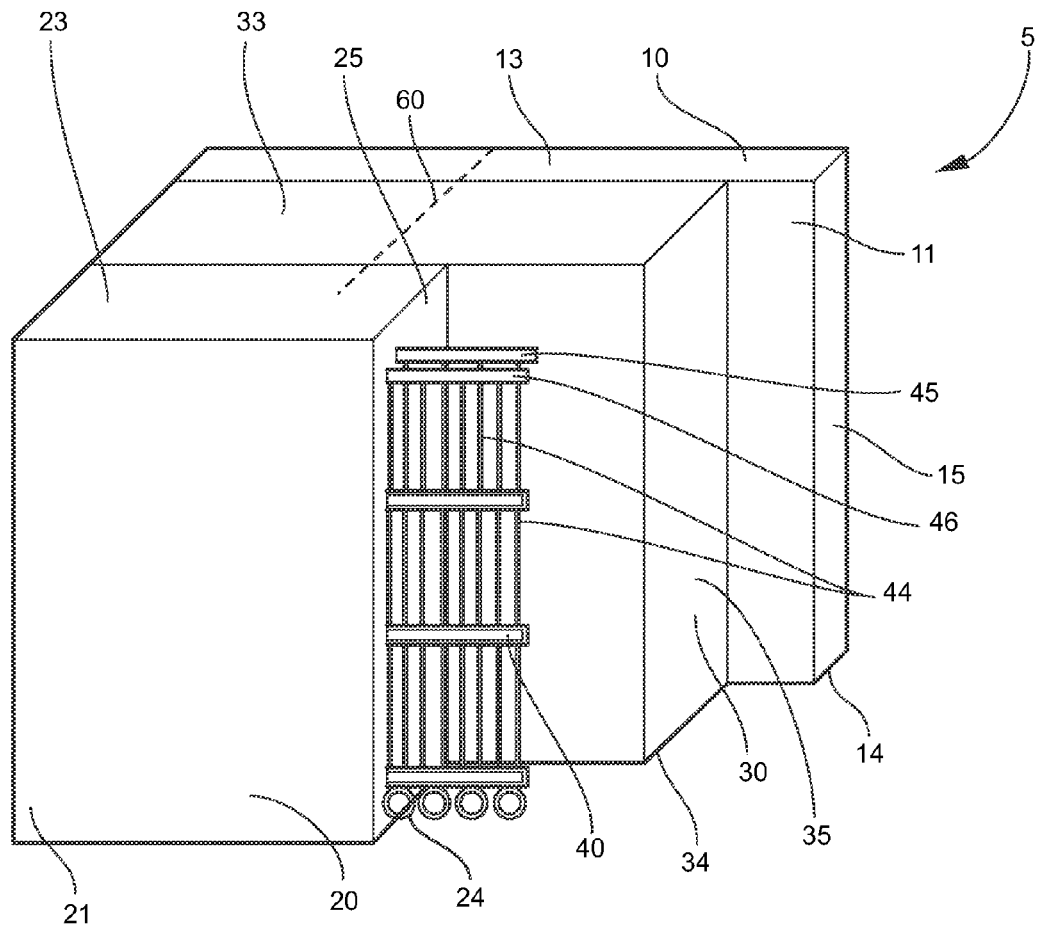
FIG. 1 illustrates an example of a high performance building system wall according to various embodiments of the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Looking to FIGS. 1-5, there is illustrated a pre-cast construction panel 5 comprising a rigid insulation layer 30 having an interior surface 31 and an exterior surface 32, an outer concrete wythe 10 secured to the exterior surface 32 side of the insulation layer 30, an inner concrete wythe 20 secured to the interior surface 31 side of the insulation layer 30, a grid system 60 which ties the outer concrete wythe 10 to the inner concrete wythe 20 and a capillary tube system 40 located within the construction panel 5 wherein liquid is passed through the tubing (42, 44, 45, 46, 50) in order to increase or decrease the temperature of the construction panel 5.

Thermal comfort is that condition of mind which expresses satisfaction with the thermal environment. Thermal energy (heat) transfers between the body and the environment through conduction, convection, radiation and evaporation. Conduction is the transfer of heat between two substances or objects through direct contact (e.g., the transfer of heat between a person's body and the air around them). Convection is the transfer of heat between 2 substances or objects through an intermediate media (e.g., the transfer of heat between an air conditioning coil and a person's body through the air around them). Radiation is the transfer of heat between 2 substances or objects through electromagnetic flux (e.g., the transfer of heat from the sun to a person's body. 2 forms of radiation heating which affect thermal comfort our solar radiation and terrestrial radiation. The direction of heat flow through radiation is always from the higher temperature substance/object to the lower temperature substance/object. Dry bulb (DB) thermometers and thermostats measure the concentration of heat in the air. It is expressed as dry bulb temperature ($T_{DB}$). Globe thermometers indirectly measure the concentration of radiant heat. It is expressed as a mean radiant temperature ($T_{MRT}$). Operative temperature ($T_O$) is the average of the dry bulb temperature ($T_{DB}$) in the mean radiant temperature ($T_{MRT}$).

$$T_O = \frac{T_{DB} + T_{MRT}}{2}$$

Maintaining thermal comfort requires controlling the operative temperature ($T_O$). Maintaining the operative temperature ($T_O$) as the dry bulb temperature ($T_{DB}$) rises requires lowering the mean radiant temperature ($T_{MRT}$), and vice versa.

TABLE 1

Dry Bulb & Mean Radiant Temperatures for 21.1° C. Operative Temperature

| ($T_{DB}$) | 23.3 | 22.7 | 22.2 | 21.7 | 21.1 | 20.6 | 20 | 19.4 | 18.9 |
| ($T_{MRT}$) | 18.9 | 19.4 | 20 | 20.6 | 21.1 | 21.7 | 22.2 | 22.7 | 23.3 |

Heat capacity is the amount of heat required to change a unit volume or weight of a substance or assembly by a unit change in temperature. For example, the heat capacity of a 16 cm thick concrete wythe is 11.5 times greater than the capacity of a typical wood- or steel-framed wall.

Thermal lag is the time required for heat to move through a substance or assembly. Put another way, thermal lag describes a body's thermal mass with respect to time. A body with high thermal mass (high heat capacity and low conductivity) will have a large thermal lag.

$$\text{Thermal Lag} = \sqrt{\frac{1}{2*\alpha*\Omega}} * L$$

Where
α=thermal diffusivity (m²/s); Ω=external angular frequency (s-1); and
L=thickness (m)

Three building systems are utilized in the precast concrete walls to yield a high performance system for providing thermal comfort. They are (1) continuously insulated precast concrete wall system; (2) passive heating and cooling with high thermal mass system; and (3) modified capillary tube hydronic heating and cooling system.

The continuously insulated precast wall system comprises a continuous layer of R-30 expanded polystyrene or other similar insulation that is preferably sandwiched between two concrete wythes 10 and 20. Looking again to the Figures, the rigid insulation 30 includes interior surface 31 which generally faces the interior of a building or the interior of a room, exterior surface 32 which generally faces the exterior of a building or the exterior of a room. The rigid insulation 30 also includes an upper edge surface 33, a lower edge surface 34 and side surfaces 35. The rigid insulation 30 can be made from any insulating material that is sufficiently rigid to withstand the pressures of the concrete placed in the form and from workers walking on the pre-cast construction panel 5. The rigid insulation 30 is made from a polymeric foam material, such as molded expanded polystyrene or extruded expanded polystyrene. Other polymeric foams can also be used, such as polyisocyanurate or polyurethane. The rigid insulation 30 should also have a density sufficient to make them substantially rigid, such as approximately 1 to approximately 3 pounds per cubic foot, preferably approximately 1.5 pounds per cubic foot. The rigid insulation 30 can be made by molding to the desired size and shape, by cutting blocks or sheets of pre-formed extruded expanded polystyrene foam into a desired size and shape or by extruding the desired shape and then cutting to the desired length. Any number of foam insulating panels can be joined together to provide a form bottom of a dimension equal to the desired height of the pre-cast construction panel 5 being formed. The rigid insulation 30 must have minimum insulating properties equivalent to the R-value of expanded polystyrene foam with a thickness in the range of 12 to 40 cm, 16 to 36 cm, 20 to 32 cm, 15 to 25 cm, or any combination thereof. Preferably, the rigid insulation 30 has an R-value equivalent to about 7.5 cm of expanded polystyrene foam; about 10 cm of expanded polystyrene foam; about 12.5 cm of expanded polystyrene foam; about 15 cm of expanded polystyrene foam; about 17.5 cm of expanded polystyrene foam; about 20 cm of expanded polystyrene foam; about 22.5 cm of expanded polystyrene foam; about 25 cm of expanded polystyrene foam; about 27.5 cm of expanded polystyrene foam; or about 30 cm of expanded polystyrene foam.

The high thermal mass system comprises a pair of geopolymer precast concrete cement walls (wythes 10 and 20) which provide high thermal mass within the conditioned spaces of the structure. The thermal performance of the geopolymer cement concrete (GCC) is comparable to Portland cement concrete due to the bulk of the volume being the same—coarse and fine aggregates.

The pre-cast construction panels 5 described herein are unique because they are part of an architectural pre-cast concrete system designed to function as a hybrid high thermal mass radiant heating and cooling system which blends both passive and active systems. Passive high thermal mass systems include interior masonry and concrete partitions as well as exterior masonry and concrete walls with the insulation located on the exterior surface. One key feature of this system is that it dampens diurnal temperature swings around the thermostat set-point temperature for the space they enclose. Active high thermal mass systems include those which have air loop rock storage bins and water loop heat storage tanks. The active high thermal mass systems act as a heat source and/or sink for on-demand heating and/or cooling.

The system described herein provides both dampening of diurnal temperature swings and predictive, on-demand heating or cooling. This is accomplished through the use of a continuously insulated architectural pre-cast concrete sandwich panel 5 with an inner concrete wythe 20 containing a capillary tube hydronic system 40. The inner concrete wythe includes an interior surface 21, exterior surface 22, upper edge surface 23, a lower edge surface 24 and a side surface 25. The inner concrete wythe 20 functions as a passive high thermal mass system to dampen diurnal temperature swings. In other embodiments, the inner concrete wythe 10 may have a thickness in the range of approximately 2.5 to 30 cm; in the range of approximately 5 to 27.5 cm; in the range of approximately 7.5 to 25 cm; in the range of approximately 10 to 22.5 cm; in the range of approximately 12.5 to 20 cm; or in the range of approximately 15 to 17.5 cm.

The system also includes an outer concrete wythe 10 which includes an interior surface 11, exterior surface 12, an upper edge surface 13, a lower surface 14 and side surfaces 15. The outer concrete wythe 10 is generally located on the exterior of a building or structure, but may also be located on the interior if the precast construction panels 5 are used within the interior of a building or structure. In other embodiments, the outer concrete wythe 10 may have a thickness in the range of approximately 2.5 to 30 cm; in the range of approximately 5 to 27.5 cm; in the range of approximately 7.5 to 25 cm; in the range of approximately 10 to 22.5 cm; in the range of approximately 12.5 to 20 cm; or in the range of approximately 15 to 17.5 cm.

In one embodiment of the present invention, the thicknesses of the rigid insulation panel 30, the inner concrete wythe 20 and outer concrete wythe 30 are not fixed. The thicknesses of each of the three layers may be determined on a project-by-project basis. Site specific conditions such as diurnal temperature swings and energy codes are factors which may be taken into consideration to determine the necessary thickness of each layer to achieve desired results.

FIG. 1 illustrates one embodiment of a high performance building system wall according to various embodiments of the present invention. In this embodiment, the building structural wall system comprises an outer concrete wythe 10 and an inner concrete wythe 20, with rigid insulation 30 between the two geopolymer concrete wythes. In preferred embodiments, the rigid insulation 30, inner concrete wythe 20, and outer concrete wythe 10 may each be approximately four to six inches thick.

Figure 6A:
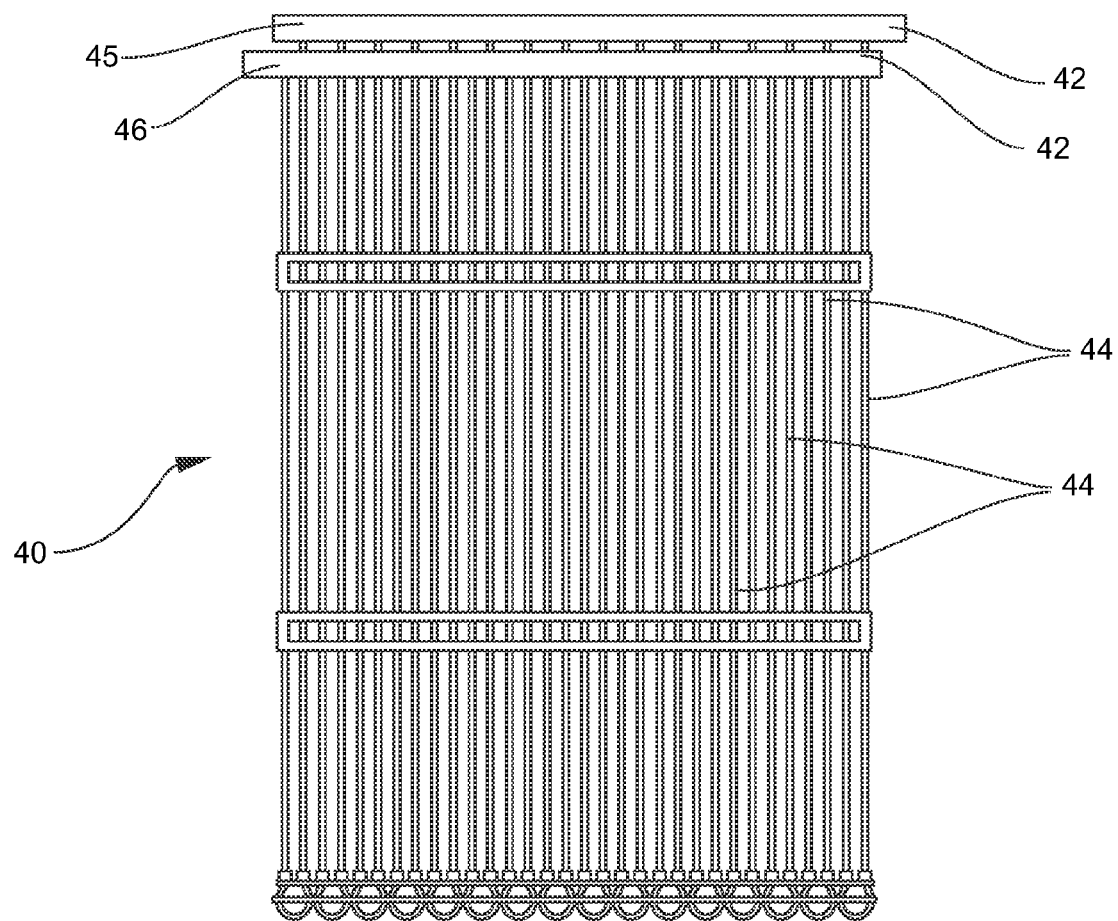
FIG. 6A is an illustration of the capillary mat according to various embodiments of the present invention.
Figure 6B:
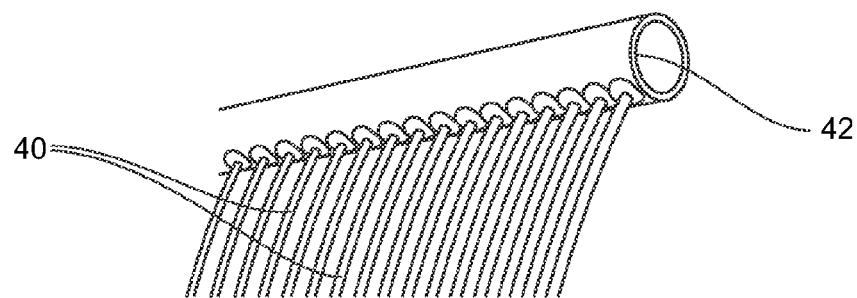
FIG. 6B is an illustration of the capillary mat according to various embodiments of the present invention.

The inner concrete wythe 20 may comprise a capillary tube hydronic system 40. The capillary tube system 40 may be used to aid in the heating of the pre-cast construction panel, the cooling of the pre-cast construction panel or a combination thereof. Generally speaking, the capillary tube system 40 includes one or more collector pipes 42 which are operationally associated with capillary tubes 44 (see FIGS. 6A and 6B). The tube system 40 may also include one or more supply pipes 45 and return pipes 46 which are used to supply and return from the capillary tubes in the construction panels 5. In preferred embodiments, the capillary tube system 40 may comprise a BEKA® capillary tube system which has more surface area than a conventional hydronic tube system with larger diameter tubing, permitting greater heat transfer. In some embodiments, the capillary tube system 40 may extend substantially the whole length and width of the inner concrete wythe 20, while in other embodiments, the capillary tube system 40 may extend in only one or more areas of the inner concrete wythe 20. In some embodiments the outer concrete wythe 10 also includes one or more sections of a capillary tube system 40. The diameter of a collector pipe 42 may range from approximately 25 mm to 40 mm, from approximately 30 mm to 35 mm, from approximately 32 mm to 34 mm, or any combination thereof. The diameter of a capillary tube 44 may range from approximately 6 mm to 10 mm, from approximately 7 mm to 9 mm, approximately 8 mm, or any combination thereof. The diameter of a supply pipe 45 and/or return pipe 46 may range from approximately 25 mm to 40 mm, from approximately 30 mm to 35 mm, from approximately 32 mm to 34 mm, or any combination thereof.

Capillary tube hydronic systems 40 may be formed in the concrete wythes 10, 20 by placing the system in the desired position, then placing the concrete, followed by vibrating the concrete, and then finally placing more concrete to fill in any gaps. In one embodiment of the present invention, the capillary tube system 40 may be set up as one or more zones which allow for the passage of liquids having different temperatures to pass through each individual zone simultaneously.

The capillary tube system 40 may be located anywhere within the inner concrete wythe 20 or the outer concrete wythe 10, however it is preferable to be located only within the inner concrete wythe 20. In one embodiment of the present invention, the capillary tube hydronic system 40 is modified from its typical application, which locates the tubes near the interior surface 21 (i.e. the surface facing the conditioned space) of the inner concrete wythe 20 in order to provide quick, on-demand heating or cooling. Instead, the capillary tube hydronic system 40 is positioned near the exterior surface 22 (distal to the surface enclosing the conditioned space), allowing the feature of thermal lag to be used to "charge" heating or cooling into the wall to prepare for expected demands. This storage feature allows more gradual accumulation of heat via a photovoltaic panels system 80 (e.g., solar collectors) or dispersal of heat via rooftop or underground cooling ponds. The capillary tube hydronic system 40 is designed to carry thermal fluid and exchange heat with the concrete. The capillary tube hydronic system 40 also performs the dual duty of heating the concrete during curing and during building operation, when the tubes 50 will constitute the radiator section of the hydronic heating and cooling system after construction.

In this and preferred embodiments, the continuously insulated wall system may utilize C-Grid®, a carbon fiber grid 60, to secure the wythes to the rigid insulation panel and to tie the concrete wythes together. In other embodiments, other types of fiber grids and similar functioning materials may be used to tie the concrete wythes together.

Figure 2:
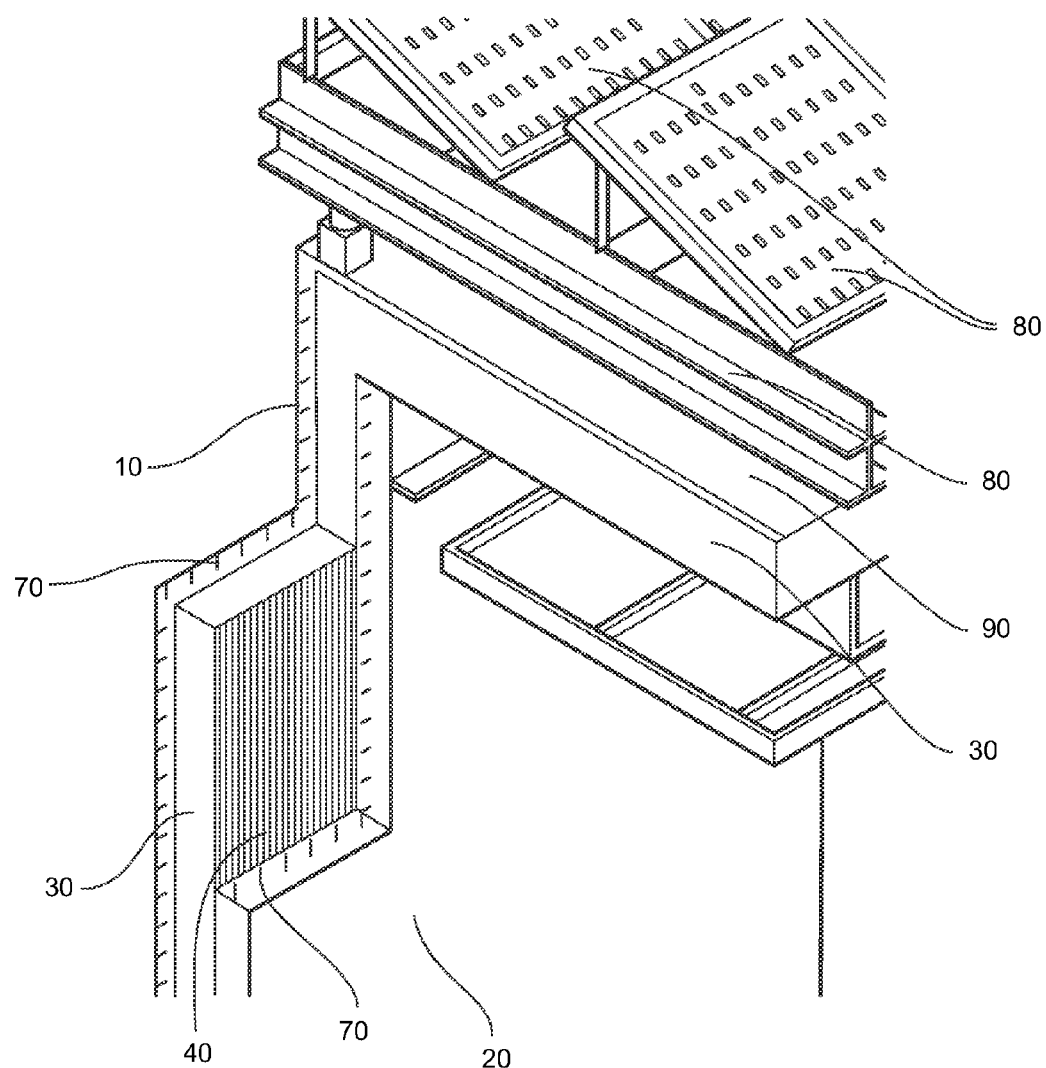
FIG. 2 represents an example of an upper section of a high performance building system according to various embodiments of the present invention.

FIG. 2 represents an example of an upper section of a high performance building system according to various embodiments of the present invention. In this embodiment, the capillary tube hydronic system 40 is located closer to the rigid insulation 30 that is sandwiched between the inner concrete wythe 20 and outer concrete wythe 10. The rigid insulation 30 also wraps around and into the ceiling of the structure. The concrete wythes 10, 20 further comprise rebar 70 for increased strength and rigidity, which may be made from metal, plastic or other suitable material. A photovoltaic panel system 80 and membrane roof 90 are depicted only to illustrate that a wide variety of roofing structures are contemplated to cover the rigid insulation 30 of the ceiling of structures utilizing the high performance building system.

Figure 3:
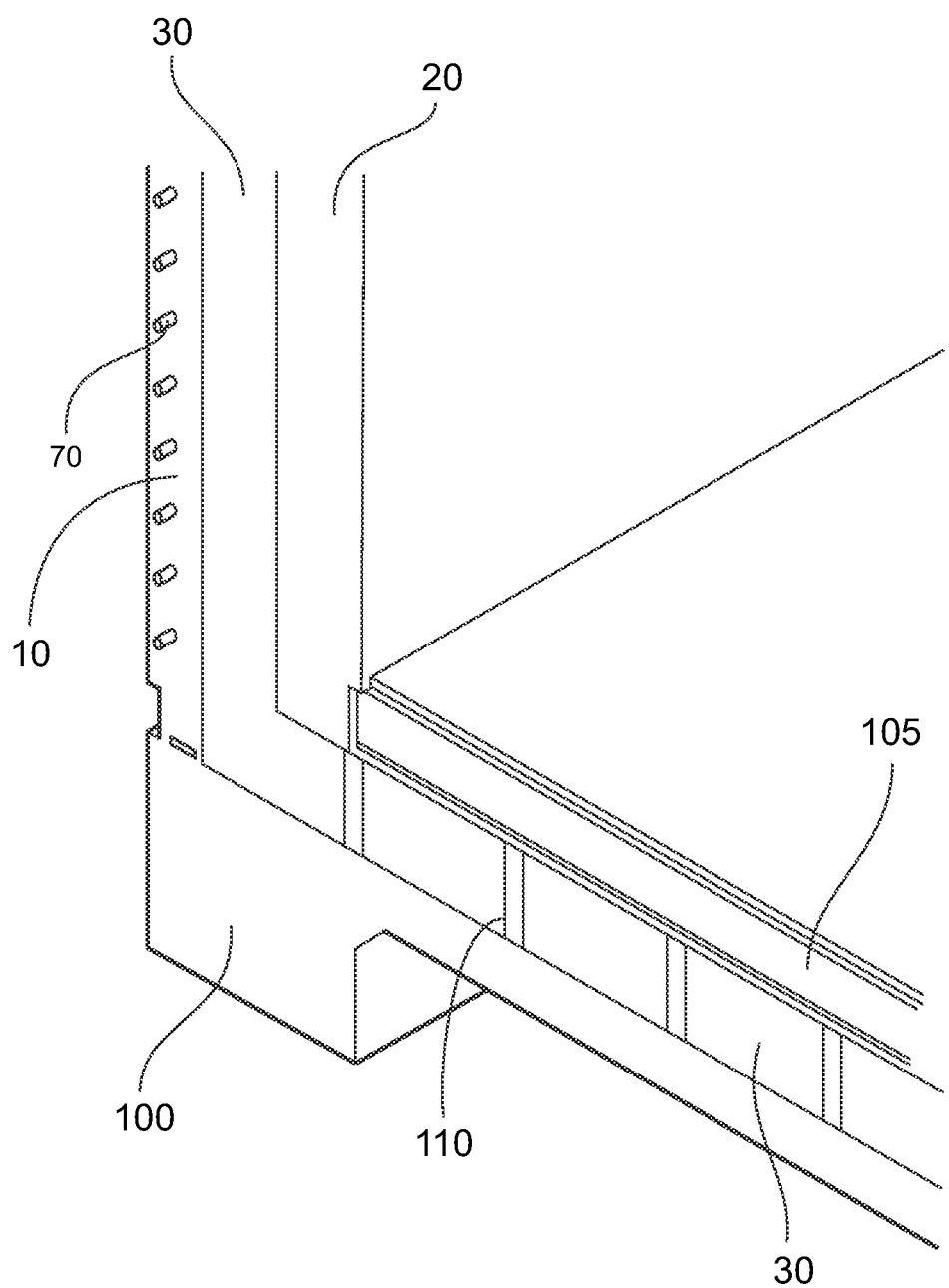
FIG. 3 depicts an example of a lower section of a high performance building system according to various embodiments of the present invention.

FIG. 3 depicts an example of a lower section of a high performance building system according to various embodiments of the present invention. In this embodiment, the rigid insulation 30 wraps around and into the floor of the structure. The rigid insulation 30 is also sandwiched between the inner concrete wythe 20 and outer concrete wythe 10 of the vertical section, and between the horizontal concrete footing 100 and wood flooring 105. In other embodiments, a further concrete footing may be positioned between the rigid insulation 30 and the wood flooring 105. Floor support beams 110 may be positioned in the rigid insulation 30 of the floor and may be made of wood, metal, concrete, plastic, or other material of similar load bearing capabilities.

Figure 4:
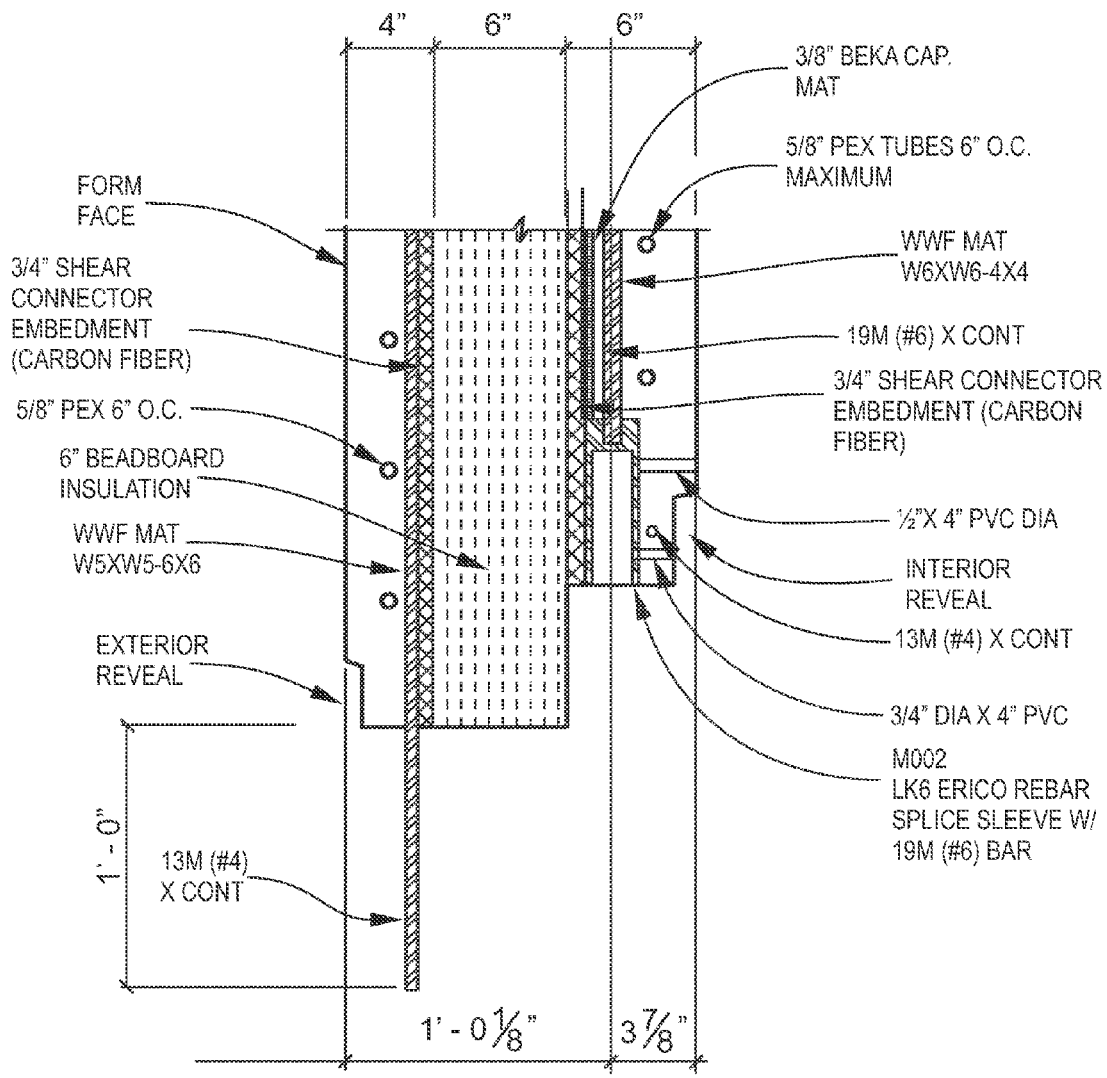
FIG. 4 is a cross section of a high performance building system wall according to various embodiments of the present invention.
Figure 5:
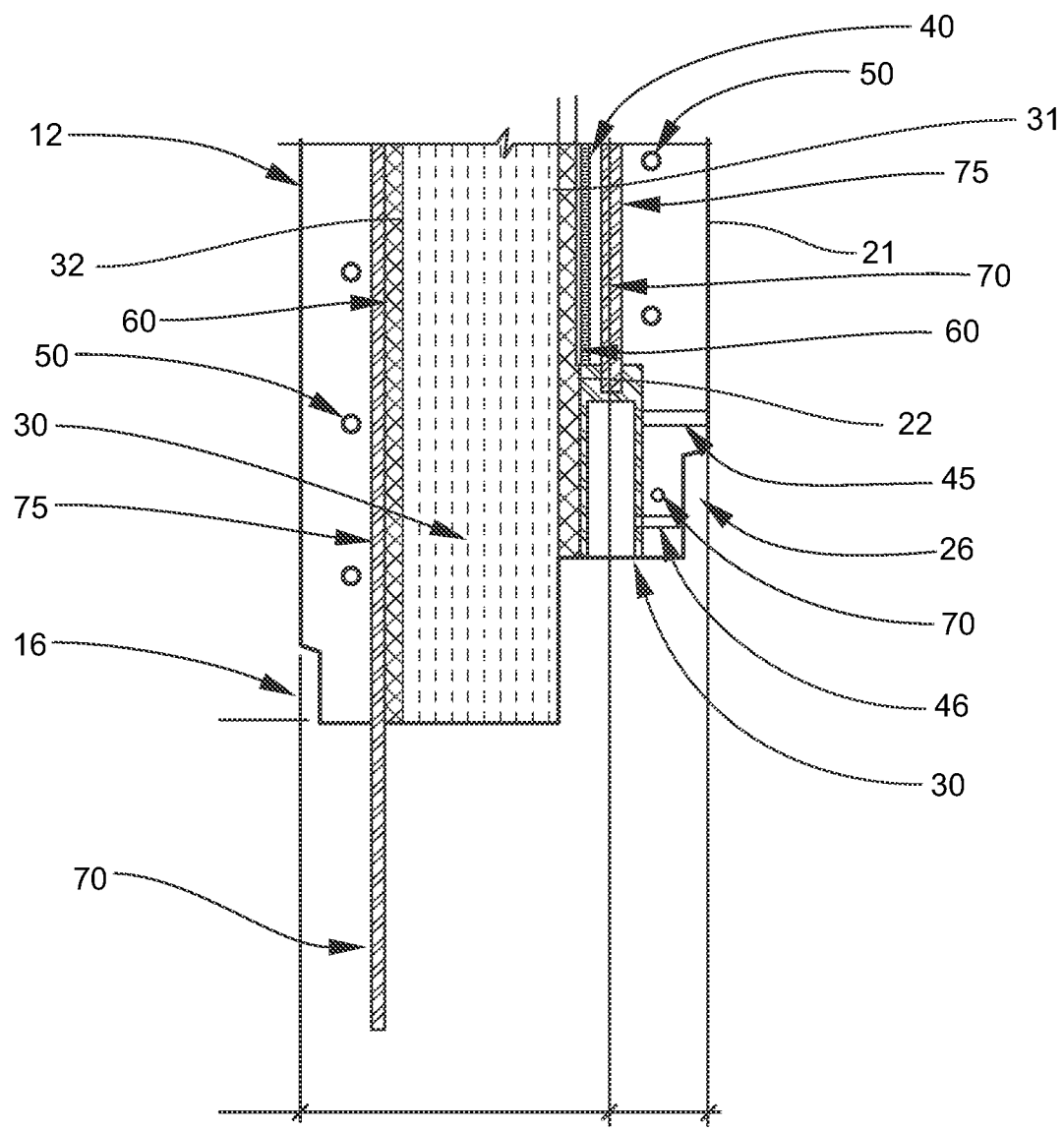
FIG. 5 is a cross section of a high performance building system wall according to various embodiments of the present invention.

The cross-section shown in FIGS. 4 and 5 depict some of the important systems which make up the pre-cast construction panel 5. These systems include a grid mat 60 which is located between the interior surface 11 of the outer concrete wythe 10 and the exterior surface 32 of the rigid insulation panel 30. The grid mat 60 is also located between the exterior surface 22 of the inner concrete wythe 20 and the interior surface 31 of the rigid insulation panel 30. The grid mat 60 functions to secure and maintain the positions of the concrete wythes 10, 20 relative to the rigid insulation panel 30. FIGS. 4 and 5 also depict the use of rebar 70 and welded wire mesh 75 within the concrete wythes 10, 20. FIGS. 4 and 5 also depict the placement in use of various diameters of tubing 50. The tubing 50 may be placed within a wythe in a specific pattern where the tubes are spaced at approximately 15 cm on center. The tubing 50 may be directly tied to the capillary tube system 40 or it may operate independently of the capillary tube system 40. The tubing 50 may aid in heating the pre-cast construction panel 5 during the curing phase of its manufacture. The tubing 50 may also aid in heating and cooling a building or structure. The diameter of a tube 50 may range from approximately 25 mm to 40 mm, from approximately 30 mm to 35 mm, from approximately 32 mm to 34 mm, or any combination thereof.

Figure 7:
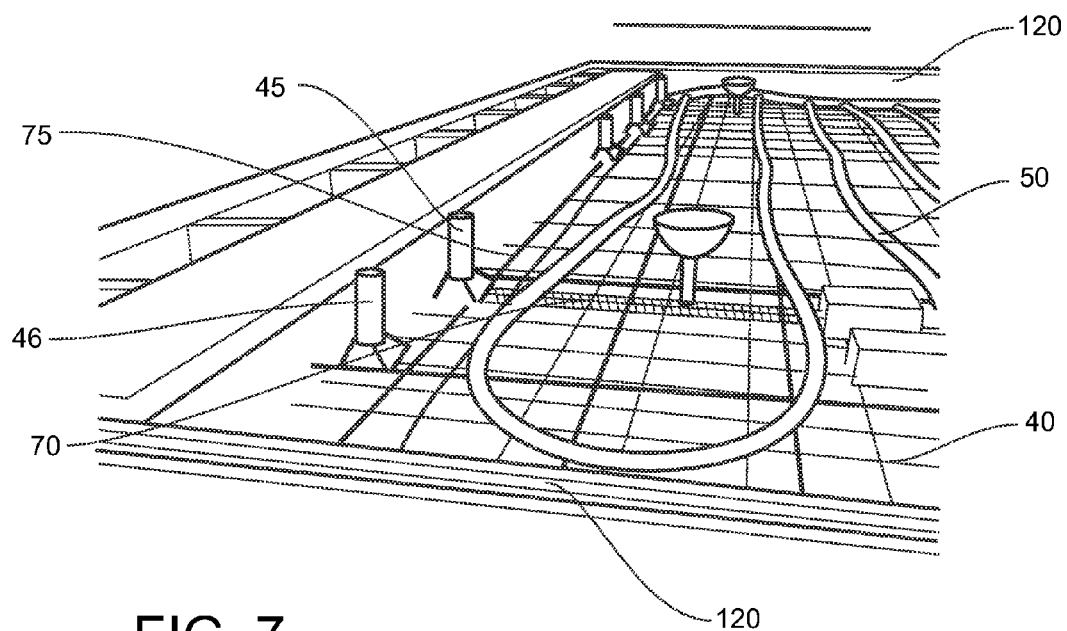
FIG. 7 depicts PEX tubes and capillary tubes for concrete curing and building climate control are tied to reinforcing steel before placing concrete.
Figure 8:
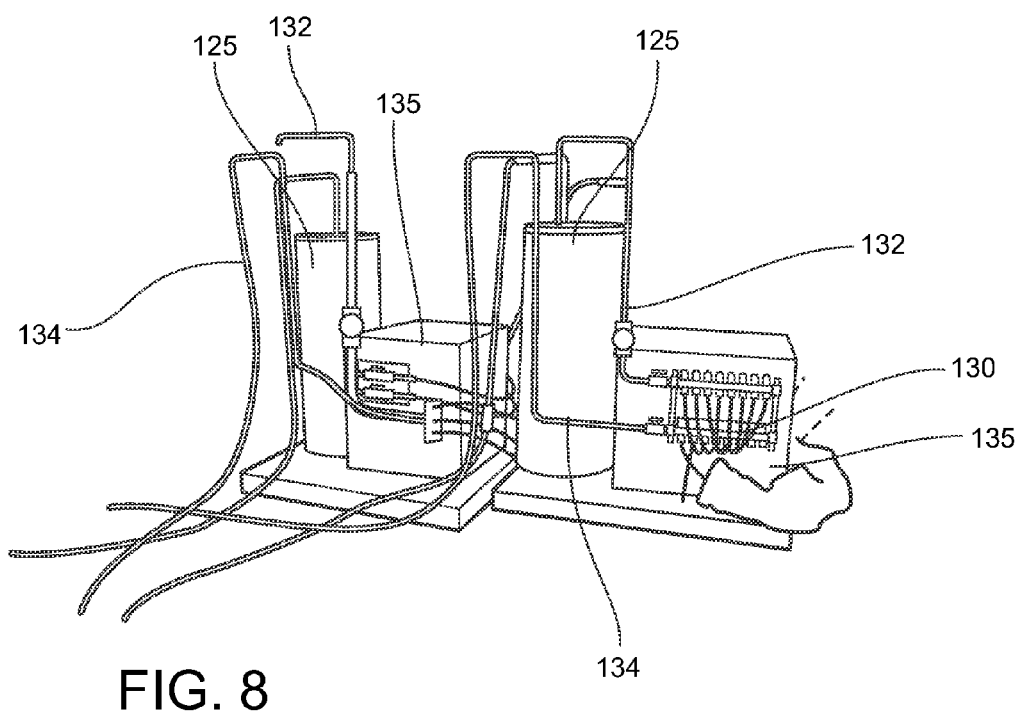
FIG. 8 depicts heating equipment for curing included two boiler units connected to a circulator pump and manifold for equalizing flow rates through multiple concrete volumes
Figure 9:
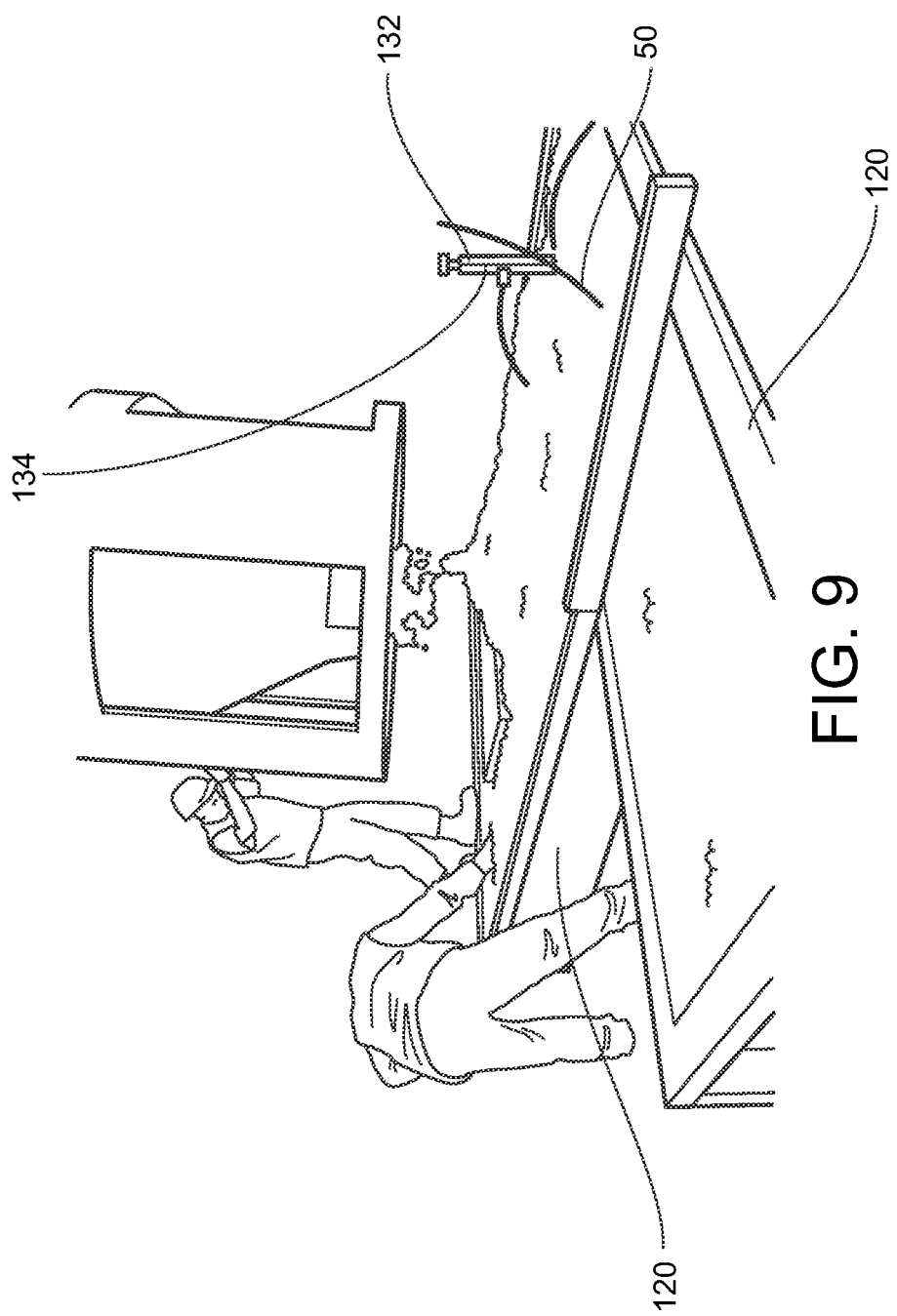
FIG. 9 illustrates a wythe being poured and made in a concrete form.

Looking now to FIG. 7, we see illustrated certain embodiments of the interior components of a wythe 10, 20. The interior components include a capillary tube system 40, tubing 50, rebar 70 and welded wire mesh 75. FIG. 8 illustrates an embodiment of a pair or fluid and/or water heaters (boilers) 125 which are used to heat the liquid to the desired temperature previously discussed. The heating system illustrates the supply lines 132 leaving the tanks and connecting to a manifold 130 which distributes the heated liquid in the manner determined by the manufacturer. The heated water then travels to additional supply lines 132 which are connected to the capillary tube system 40 located within a whythe 10, 20 to heat and cure the GCC during wall manufacture. The fluid then returns to the manifold 130 via return lines 134 where it is taken back to the water heater 125 to be heated again and cycled as many times as necessary to maintain a desired temperature for a desired duration to cure the concrete. Embodiments of the concrete forms 120 are illustrated in FIGS. 7 and 9.

Geopolymer cements may be formed by dissolving an alumino-silicate material in an alkaline solution. This will form a paste which is then mixed with aggregates and cured to form concrete with strength and elastic characteristics very similar to Portland cement concrete (PCC). Acceptable alumino-silicate materials are known in the art and specifically include fly ash, the industrial byproduct of coal combustion. Several characteristics, including low tendency for shrinkage and creep when compared with PCC and rapid strength development make GCC attractive for precast and pre-stressed concrete construction. The instant invention contemplates the use of GCC, PCC or a combination thereof in the fabrication of pre-cast construction panels 5.

GCC has promise to become an environmentally favorable alternative for construction due to its incorporation of recycled ashes and independence from the carbon dioxide emissions associated with the manufacturing of Portland cement. Geopolymer advocates focus on the avoidance of emissions associated with energy inputs in addition to emissions of the limestone calcination process associated with Portland cement manufacture. Estimates range from as high as 80% in a reduction of $CO_2$ emissions associated with the production of GCC. The production of geopolymer concrete requires some energy expenditure due to the elevated temperature curing processes and the production of activating chemicals that are necessary to develop cementitious properties. However, unlike the Portland cement manufacture process, current technology offers opportunities to remove $CO_2$ from geopolymer cement concrete production processes. Strategies to decrease $CO_2$ include using waste heat for curing and manufacturing activating chemicals with energy from renewable or carbon-neutral sources.

Geopolymer cement concrete (GCC) contains no Portland cement aggregates, and may be made by using a mixer truck to mix Class F fly ash and activating solution. Class F fly ashes are "activated" with caustic soda to develop cementitious properties comparable to Portland cement. GCC may be compared using any method or technique known in the art. In one embodiment, GCC is prepared with standard batching equipment. Once mixed, the GCC is placed into concrete forms 120. The GCC then ages for up to two days at room temperature after which it is then is heated to 75° C. to complete the curing process.

Geopolymerization Process

The introduction of fly ash to concretes containing Portland cement causes a series of hydration reactions which result in the formation of Calcium Silicate Hydrate (C-S-H) crystals resulting in increased strength. Contact between Portland cement grains and water initiate the reactions. Geopolymerization is initiated by contact between an alumina-silica source material (i.e. fly ash) and an activating solution with high pH resulting in a three phase process which includes dissolution, reorientation and hardening.

Dissolution:
Silica and alumina monomers are released after the source material is mixed with an alkaline activating solution. The degree to which the source material dissolves is related to the reactivity of the material, the strength of the activating solution and the duration of time allowed for this phase. In one embodiment of the present invention, the activating solution is a combination of an alkaline soda (e.g., sodium hydroxide, potassium hydroxide) and a soluble silica source (e.g. sodium silicate). The normality of effective solutions typically ranges from 5N-10N.

Reorientation:
During the reorientation phase, the alumina and silica monomers begin to reorganize and condense into larger groups. As the groups form, water molecules are released. The progress of this phase may be affected by the dissolution phase and the alkalinity of the activating solution. The reorientation phase results in a continuous, polymeric network of three dimensional alumina-silicate structures.

Hardening:
The mass which results from the previous two phases may harden slightly on its own depending on the make-up of the source materials and the ambient conditions. Nonetheless, in order to gain significant strength, the material must be cured using heat supplied by an external source, unlike Portland cement which produces and excess amount of heat due to the exothermic nature of its reaction. It has been found that temperatures increasing up to 100° C. lead to accelerated hardening and strength gain. Temperatures below 60° C. were found to provide unsuitably slow reactions when unmodified source materials are used. In one embodiment of the present invention, the precast GCC is heated to a temperature in the range of 60 to 100° C., 65 to 95° C., 70 to 90° C., 75 to 85° C., or 70 to 80° C. in order to cure the GCC.

The dissolution and reorientation phases may occur concurrently to some degree. Initiation of hardening tends to preclude further transport of geopolymer precursors and causes an end to these phases. The availability of nucleation sites caused by the presence of calcium or iron in the mixture or a drop in pH may initiate hardening autogeneously. External application of heat also triggers the hardening of the matrix. Dissolution and reorientation periods which exceed 48 hours provide few gains to material performance of the GCC. The material typically exhibits at least 80% of its ultimate compressive strength development after completion of the hardening phase.

In one embodiment of the present invention, production of the GCC begins by dissolving fly ash in a mixture of sodium silicate and sodium hydroxide to form a paste that will become a binder. Typical granite aggregates and silica concrete sand are blended with the binder paste in a concrete mixer. Like PCC, the resulting fresh concrete can be formed into a variety of shapes before it hardens. Unlike PCC, the GCC does not gain significant strength until it cures at an elevated temperature. Therefore, the final step of the material preparation process involves baking the components at a temperature of 60 to 85° C. for several hours. The process of constructing GCC components is very similar to building precast PCC elements.

Mix Design Development

A concrete mixture was developed and 15 individual batches having the proportions shown in Table 3 were made. Although the batches had identical mixing proportions of the aggregates and cementitious materials and 3"×6" cylinders were prepared from each batch and tested after 3 days, immediately following high temperature curing. Average compressive strength results of the fifteen consecutive pours are presented in Table 4. Variations in the strength are results of small differences in batching procedures, aggregate moisture content and other factors.

ACI 318-11 provides a process for setting the design strength of concrete mixes based on compressive strength test results of Portland cement concretes. The intent of the procedure is to ensure that the probability of obtaining compressive strength results below the design target is less than 1%. The mean strength value and standard deviation of the data presented in Table 4 are 5,250 psi and 355 psi, respectively. ACI 318-11 Table 5.3.1.2 provides a modification factor of 1.16 for the standard deviation of data sets based on 15 tests. The requirements of ACI 318-11 Table 5.3.2.1 lead to a safe design strength of 4,800 psi for the GCC mixture that was developed.

Production Process

Given the conditions that are necessary for formation of geopolymers, most importantly the elevated temperature curing, certain accommodation must be made in the production process. The predominant considerations discovered during the production process included heating methods suitable for large concrete castings and finishing techniques that work for GCC.

Table 3 below illustrates one embodiment of a curing protocol for a batch of GCC. In this embodiment, the geopolymer concrete composed of 100% fly ash is allowed a two day room temperature aging and one day curing routine. After the concrete is mixed according to regular mixing procedures, the concrete is allowed to age at room temperature for 48 hours. After the aging period the concrete is then heated for 24 hours at a temperature of 75° C.

TABLE 3

GCC Mix Design to yield 0.76 m$^3$ (1.0 yd$^3$)

| Material | Sodium Silicate | Sodium Hydroxide | Fly Ash | Fine Aggregate | Coarse Aggregate | Water | Total |
| --- | --- | --- | --- | --- | --- | --- | --- |
| kg | 126 | 16 | 357 | 621 | 621 | 34 | 1,776 |

TABLE 4

GCC Compressive Strength Test Results to be Used for Statistical Analysis

| Test Number | Compressive Strength [psi] |
| --- | --- |
| 1 | 5,930 |
| 2 | 5,212 |
| 3 | 5,212 |
| 4 | 5,109 |
| 5 | 4,808 |
| 6 | 5,151 |
| 7 | 5,148 |
| 8 | 5,567 |
| 9 | 5,723 |
| 10 | 5,134 |
| 11 | 5,649 |
| 12 | 5,412 |
| 13 | 4,889 |
| 14 | 4,609 |
| 15 | 5,268 |

As stated previously, GCC is often cured within the range of 60°-100° C. To aid in this heating step, one solution is to insulate the formwork and top face of the concrete slab and use the capillary tube system 40 embedded in the wall panels to circulate heated water. This solution is possible only because the tube system is already contained within the panel 5. However, there are challenges to adapting currently available heating equipment to accommodate GCC curing due the fact that most heated formwork is made of steel, which can be reactive with the fresh geopolymer unless the release agent is able to isolate the two materials from one another.

Figure 11:
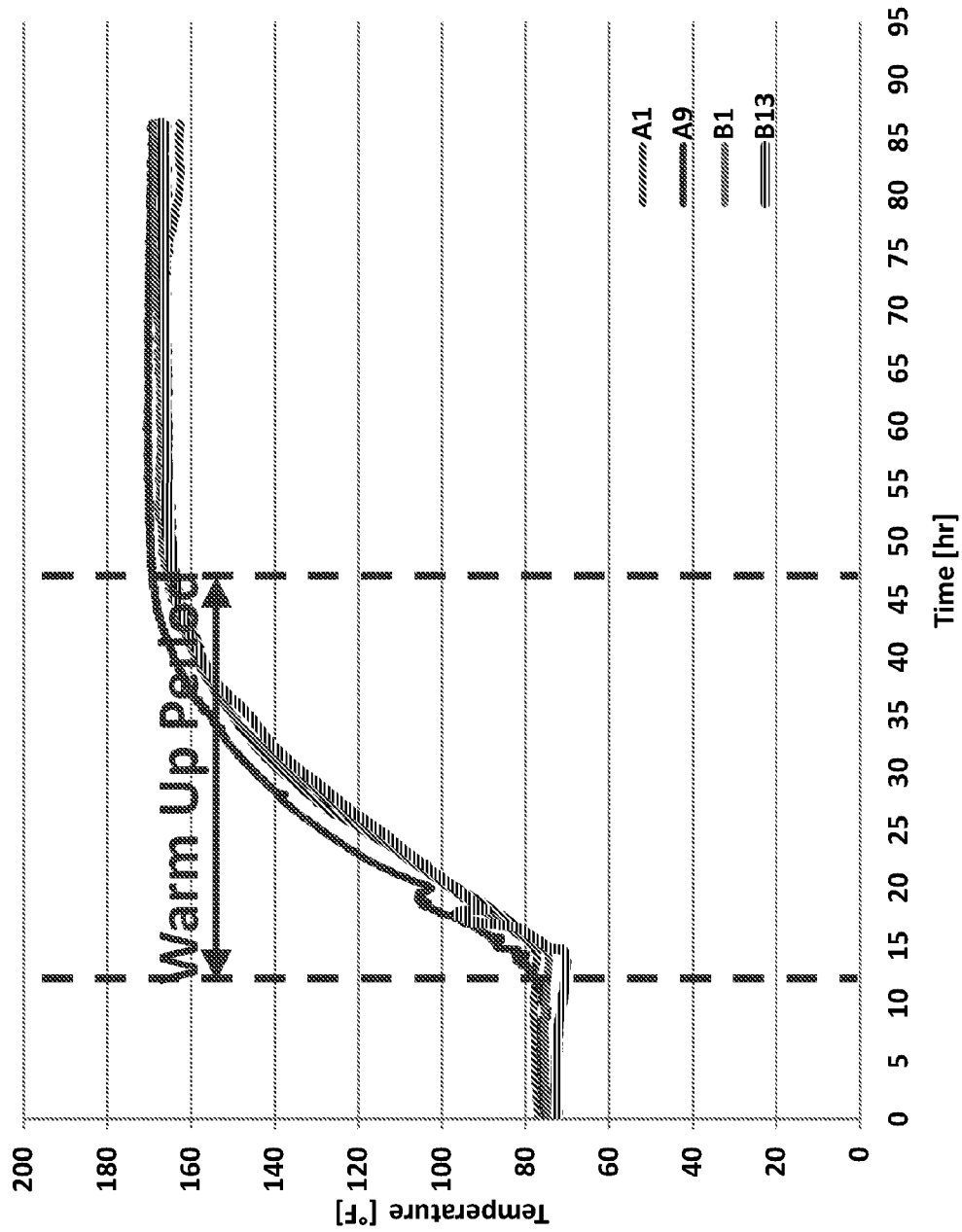
FIG. 11 illustrates the temperature of panels during the heated curing process of the instant invention.

FIG. 11 illustrates the results recorded when a network of temperature sensors was embedded in the concrete of a panel to track temperature during the curing process. The sensors were distributed at a variety of locations which represent several depths, proximity to edges (13, 14, 23, 24) and proximity to capillary tube system 40. The curing requirements determined during the mix design development process indicated that 24 hours at the target temperature were sufficient to develop the concrete design strength. A 12 kw boiler heated the panels containing 9 m$^3$ of GCC from 25° C. to 77° C. in approximately 35 hours. After the concrete reached the target temperature, the boiler held the temperature for an additional 35 hours prior to shutting the system down and allowing the concrete to cool. Additional time beyond 24 hours was added as a precaution to ensure that all areas reached the target temperature. Because the sensors continue to function after the curing process, they may be incorporated into the building monitoring and control system.

FIG. 7 illustrates an embodiment of the present invention comprising hydronic tubes 40 having an inside diameter in the range of 0.1 to 4 cm, 0.5 to 3.5 cm, 1 to 3 cm or 1.5 to 2.5 cm. The tubes which make up the tube system 40 are comprised of a material selected from the group of metals, glass, plastic, or a combination thereof. In one embodiment, the tube system is comprised of tubes made from a cross-linked polyethylene (PEX). In another embodiment, the tube system 40 is secured to a matt of welded wire fabric. The matt ensures that the spacing of the tubes is maintained at 15 cm on center for even distribution of heat to all areas of the concrete volume. Water is then passed through the tubes after it heated by any means known in the art such as a tank boiler with an electronic thermostat and pump system, shown in FIG. 8.

The ability to accurately reproduce colors is important to architectural precast concrete. While gray cement varies in its tint, the availability of white cements allows those who precast concrete to use colorants to accurately and consistently match colors between batches. The color of GCC is a function of the color of the fly ash, which might vary from dark gray to light pink, depending on the fly ash source. It is not unusual for ashes from the same source to vary from one delivery to the next due to the fact that their composition is affected by the combustion parameters at the power plant or factory where they are produced. In one embodiment of the present invention, commercially available colorants are used to change color. These included doses of earth oxides for yellows and reds, as well as titanium dioxide for a very light gray Source Materials Fly ash, also known as flue-ash, is one of the residues generated in combustion, and comprises the fine particles that rise with the flue gases. In contrast, ash that does not rise is called bottom ash. In an industrial context, fly ash generally refers to ash produced during combustion of coal. In the instant invention, class F, low calcium fly ashes typically are suitable source materials for GCC. However, some variation in ash characteristics that do not significantly impact its use in PCC can have detrimental effects in GCC. Factors such as the age, amorphous fraction, elemental composition, particle size, and carbon content of the ash all have significant impacts on the fresh and cured characteristics of the GCC. While the relationships between these ash characteristics and the cured mechanical performance of the GCC are generally understood, there is not yet a process of rapidly adapting activating solutions or curing regimens to changing characteristics of the source material. The process of adjusting GCC mix designs to new source materials is much the same as developing mix designs for PCC-estimating proportions with general mix design guidance, testing and adjusting.

Mixing

The GCC may be mixed by any method known in the art. In one embodiment, the GCC is mixed in a 10 cubic yard rotary drum truck. The aggregates and ashes are measured out and added to the mixer at a batch plant. The ashes, aggregates and water are charged into the mixer at the batch plant. Activator solution is then added directly to the mixer through the charge hopper immediately before mixing.

Formwork and Finish

Form-making materials must be selected in order to find a surface suitable texture for the panels as well as to find a material that would be durable through several uses and non-reactive with the geopolymer. Steel formwork may be used, but is often met with undesirable interaction between the steel and the GCC. A thick form release agent may be used to prevent interaction with the GCC. Lighter form oils were destroyed by the high levels of alkalinity in the fresh geopolymer. The use of iron can provide nucleation points for the formation of the geopolymer, resulting in excessive bonding between the GCC and the formwork during the curing process. This often results in large spalls when a wythe is removed from a form. Plastic form liners made from polyethylene are preferred as they are durable and impart a very smooth finish to the GCC. Any form liner resistant to the alkalinity in the GCC may be used and include, but are not limited to, liners made from wood, wood coated with a wood sealer, plastic, or a combination thereof.

The concrete cast against the formwork generally picks up very fine detail and reflects the smoothness of the surface, while the exposed side may be float-finished with a bull float. The panels may also be skim coated with gypsum plaster as a finish.

The formed or precast geopolymer cement concrete is suitable for use in structures, precast modular components, pavements and other concrete infrastructure. Geopolymer cement concrete has the benefit of including high thermal mass within the conditioned spaces is a dampening of the diurnal temperature swings. In preferred embodiments, geopolymer concrete is used to form the concrete wythes of the insulated precast concrete wall system. In other embodiments, other types and mixes of concrete may be used to form the wythes of the insulated precast concrete wall system.

Figure 10:
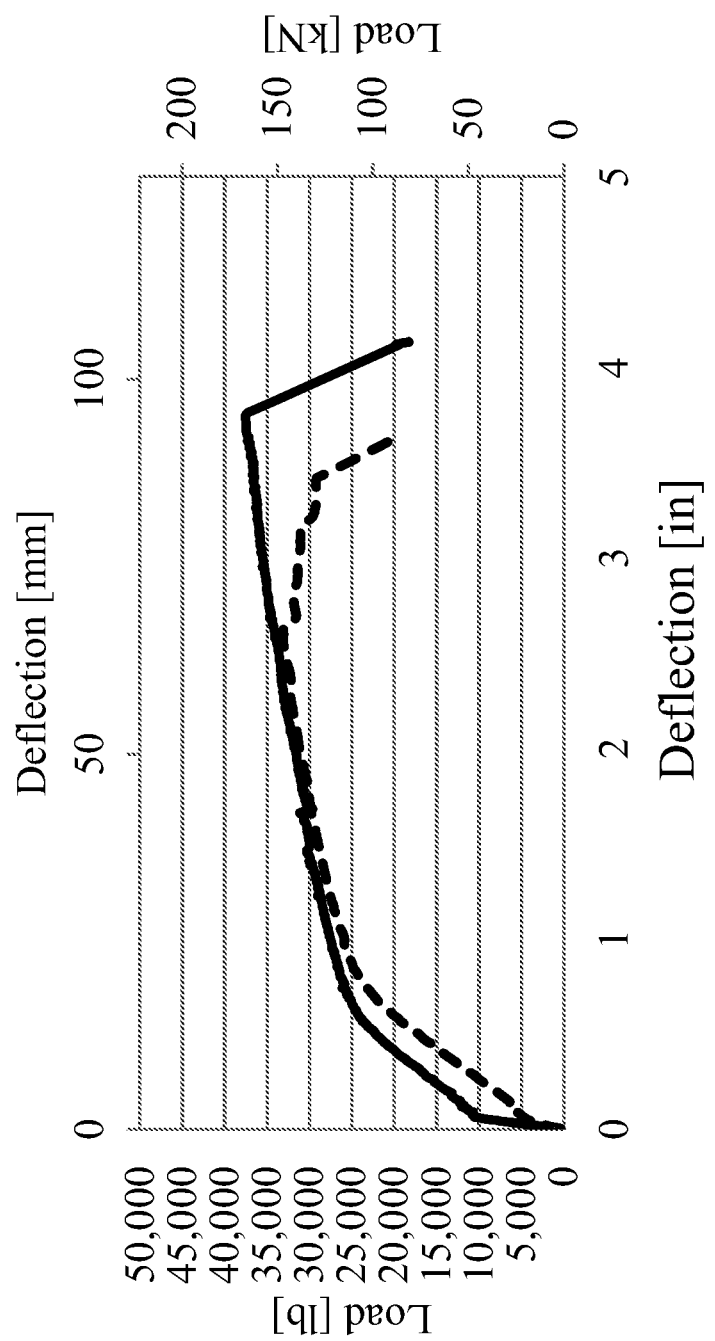
FIG. 10 illustrates the deflection strength of GCC panels in comparison to PCC panels.

The strength of the resulting materials ranges from 34.5-68.9 MPa (5,000-10,000 psi) depending on the proportions, aggregates and curing conditions. In one embodiment of the present invention, the material characteristics of GCC specimens and the elastic modulus is related to compressive strength in a manner similar to PCC. In still another embodiment, illustrated in FIG. 10, the GCC used meets the flexural design requirements given by ACI 318 which relate to the Building Code Requirements for Structural Concrete. Load vs. mid-span deflection plots of destructive tests conducted on 3.7 m reinforced GCC (82.0 MPa [11,900 psi]) and PCC (86.2 MPa [12,500 psi]) specimens having identical 200× 300 mm (8"×12") cross section and reinforcing are presented in FIG. 10. The testing demonstrates that the performance of the two concrete materials is quite similar, especially in the service load range. The GCC beam showed greater deformation prior to failure, a desirable feature for structural safety.

In one embodiment of the present invention, the construction panel further comprises a photovoltaic panel system 80 operationally associated with the capillary tube system 40 which functions to assist in heating and/or cooling the interior or exterior of a structure. The present invention also includes a building or structure made from a plurality of precast construction panels 5 as disclosed within the instant invention. The building or structure includes both the interior walls and the exterior walls made from precast construction panels 5 according to the instant invention. The rigid insulation layer 30 can extend from the walls to the floor(s) of the building or structure (See FIG. 3). The rigid insulation layer 30 can extend from the walls to the ceiling(s) of the building or structure See FIG. 2).

The present invention also includes a method of assembling or manufacturing a pre-cast construction panel comprising the steps of:

a) preparing a mold or form 120 for an inner concrete wythe 20, including coating the inner surface of the mold or form 120 with a releasing agent;
b) preparing a mold or form 120 for an outer concrete wythe 10, including coating the inner surface of the mold or form 120 with a releasing agent;
c) inserting and securing one or more capillary tube sections 40 into the one or more molds/forms 120:
d) inserting and securing some form of internal support structure (i.e. welded wire mesh, rebar, carbon fiber material) into the one or more molds/forms 120;
e) preparing one or more types of concrete resulting in one or more concrete mixes;
f) pouring the concrete mix(es) into the molds/forms 120;
g) compacting the concrete mix within each form/mold 120 using a vibrating tool;
h) securing a grid system or grid mat 60 to the interior surface 31 and the exterior surface 32 of a piece of rigid insulation 30;
i) placing the piece of rigid insulation 30 between the inner concrete wythe mold/form and the outer concrete wythe mold/form to ensure that the inner concrete wythe 20 and the outer concrete wythe 10 are secured to grid mat(s) 60 and the rigid insulation 30;
j) allowing the inner concrete wythe 20 and the outer concrete wythe 10 to cure for a period of time;
k) connecting a water supply to the one or more capillary tube sections 40;
l) pumping water through the one or more capillary tube sections 40 to further cure the inner concrete wythe 20 and outer concrete wythe 10 for a period of time; and
m) removing the molds/forms 120 resulting in a completed pre-cast construction panel 5.

Another embodiment of the present invention involves a method of assembling or manufacturing a pre-cast construction panel comprising the steps of:

a) preparing a mold or form 120 for an inner concrete wythe 20 including coating the inner surface of the mold or form 120 with a releasing agent;
b) preparing a mold or form 120 for an outer concrete wythe 10 including coating the inner surface of the mold or form 120 with a releasing agent;
c) inserting and securing one or more capillary tube sections 40 into the one or more molds/forms 120;
d) inserting and securing a welded wire mesh 75 into the one or more molds/forms 120;
e) inserting and securing rebar 70 into the one or more molds/forms 120;
f) inserting and securing additional tubing 50 into the one or more molds/forms 120;
g) preparing one or more types of concrete resulting in one or more concrete mixes;
h) pouring the concrete mix(es) into the molds/forms 120;

i) compacting the concrete mix within each form/mold 120 using a vibrating tool;
j) allowing the inner concrete wythe 20 and the outer concrete wythe 10 to cure for a period of time;
k) connecting a water supply to the one or more capillary tube sections 40;
l) pumping heated water through the one or more capillary tube sections 40 to further cure the inner concrete wythe 20 and outer concrete wythe 10 for a period of time to further strengthen and cure the wythes;
m) disconnecting the water supply from the capillary tube sections 40;
n) removing the inner concrete wythe 20 and the outer concrete wythe 10 from the molds/forms 120;
o) applying adhesive to an inner surface 31 and an exterior surface 32 of a piece of rigid insulation 30;
p) securing a grid system or grid mat 60 to the interior surface 31 and the exterior surface 32 of the piece of rigid insulation 30;
q) placing the piece of rigid insulation 30 between the inner concrete wythe mold/form and the outer concrete wythe mold/form to ensure that the inner concrete wythe 20 and the outer concrete wythe 10 are secured to grid mat(s) 60 and the rigid insulation 30 resulting in a completed pre-cast construction panel 5.

The period of time for allowing the freshly poured concrete to cure during the manufacture of wythes 10, 20 of the above pre-cast construction panel may range from 1 to 36 hours; 1 to 30 hours; 1 to 24 hours; 12 to 24 hours; or 18 to 24 hours. The period of time pumping heated water through the one or more capillary tube sections 40 may range from 6 to 60 hours; from 12 to 48 hours; from 24 to 48 hours, or any combination thereof at any temperature mentioned within this application.

Figure 12:
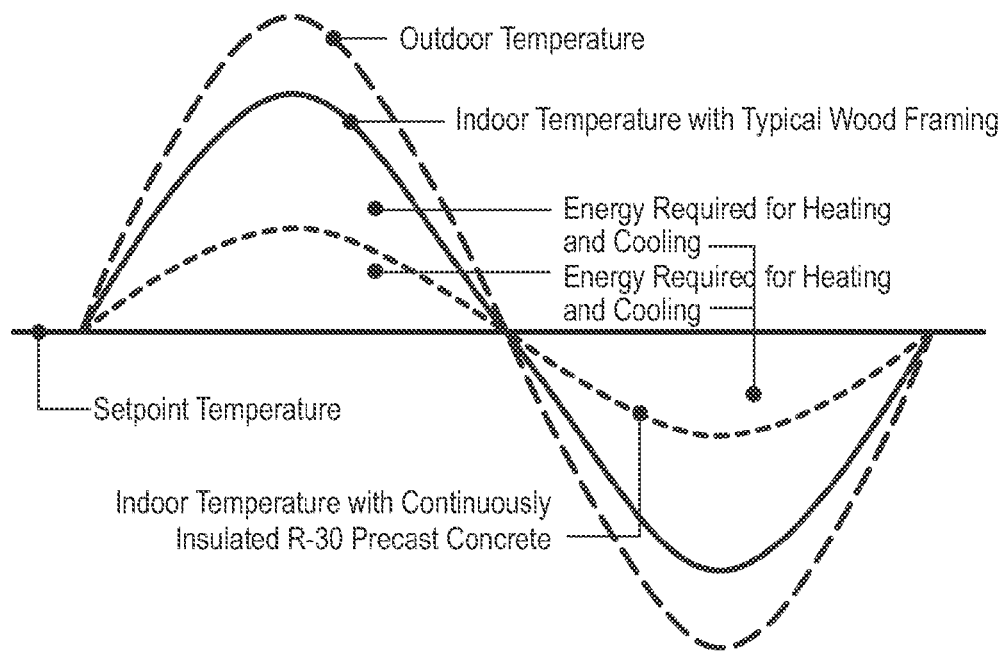
FIG. 12 illustrates temperature gradients of heating and cooling structures.
Figure 13:
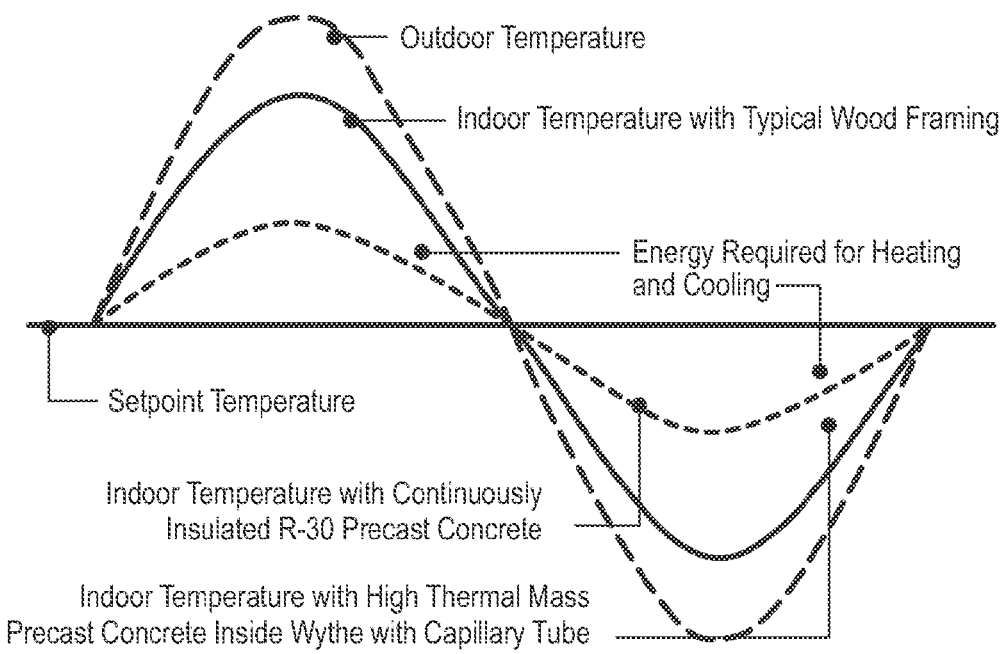
FIG. 13 illustrates temperature gradients of heating and cooling structures.
Figure 14:
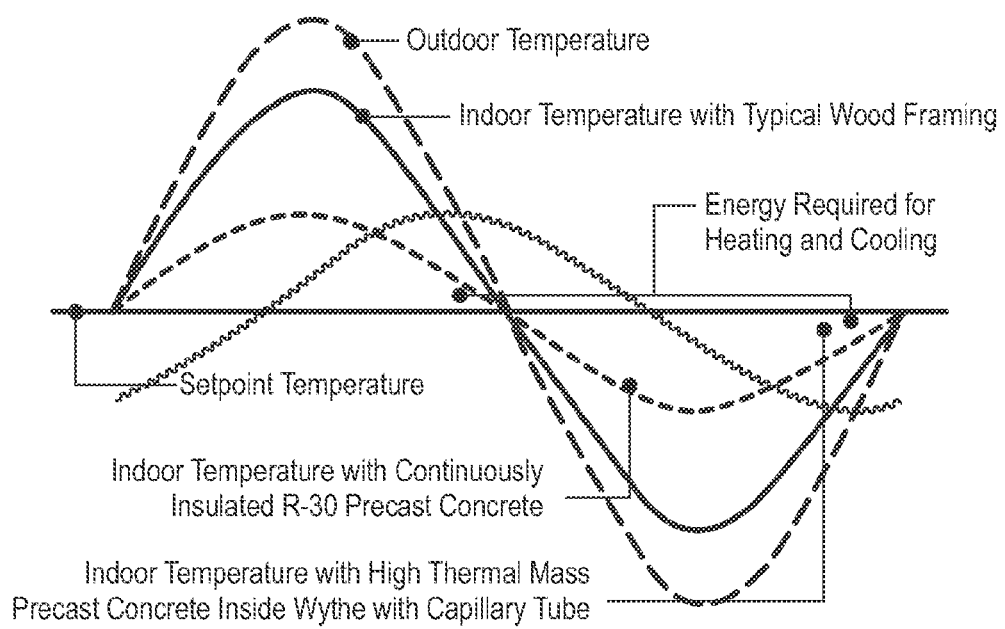
FIG. 14 illustrates temperature gradients of heating and cooling structures.

Looking now to FIGS. 12-14, there is illustrated temperature gradients of structures comparing a typical wood-framed structure and a pre-cast construction panel structure regarding:
1. The energy requirement for heating and cooling of each structure;
2. The interior temperature of each structure; and
3. The exterior temperature.

FIG. 12 illustrates a typical wood-framed structure compared to a pre-cast R-30 construction panel structure. FIG. 13 illustrates a typical wood-framed structure compared to a pre-cast R-30 construction panel structure and a pre-cast construction panel with an inner wythe 20 including a high thermal mass pre-case concrete. FIG. 14 illustrates a typical wood-framed structure compared to a pre-cast R-30 construction panel structure and a pre-cast construction panel with an inner wythe 20 including a high thermal mass pre-case concrete and a capillary tube system 40.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

What is claimed is:

1. A pre-cast construction panel comprising:
a rigid insulation layer having an interior surface and an exterior surface;
an outer concrete wythe secured to the exterior surface of the insulation layer;
an inner concrete wythe secured to the interior surface of the insulation layer;
a grid system which ties the outer concrete wythe to the inner concrete wythe; and
a capillary tube system located within the construction panel;
wherein the capillary tube system is comprised of one or more collector pipes each having a diameter in the range of 25 to 40 mm and a plurality of capillary tubes having a diameter in the range of 6 to 10 mm and extending from the collector pipes as a series of loops;
wherein liquid is passed through the capillary tube system in order to increase or decrease the temperature of the construction panel.

2. The construction panel of claim 1 wherein the rigid insulation layer has a thickness in the range of 12 to 40 cm, the outer concrete wythe has a thickness in the range of 12 to 40 cm, and the inner concrete wythe has a thickness in the range of 12 to 40 cm.

3. The construction panel of claim 1 wherein the outer concrete wythe and the inner concrete wythe are constructed of a geo-polymer concrete.

4. The construction panel of claim 1 wherein the grid system is selected from the group including a carbon fiber grid, steel grid, or a combination thereof.

5. The construction panel of claim 1 wherein the capillary tube system is located within the inner concrete wythe.

6. The construction panel of claim 1 wherein the capillary tube system is separated into two or more zones which allow for the passage of liquids having different temperatures to pass through each zone simultaneously.

7. The construction panel of claim 1 further comprising a photovoltaic panel system operationally associated with the capillary tube system which functions to assist in heating and/or cooling the interior or exterior of the structure.

8. The construction panel of claim 1 further comprising a photovoltaic panel system operationally associated with the capillary tube system which functions to assist in heating and/or cooling the interior or exterior of the structure.

9. A building or structure made from a plurality of precast construction panels according to claim 1 of the instant invention.

10. The building or structure of claim 9 wherein the rigid insulation layer extends from the walls to the floor(s) of the building or structure.

11. The building or structure of claim 9 wherein the rigid insulation layer extends from the walls to the ceiling(s) of the building or structure.

\* \* \* \* \*